(12) United States Patent
Watson et al.

(10) Patent No.: US 8,787,223 B2
(45) Date of Patent: Jul. 22, 2014

(54) COAXIAL CABLE DISTRIBUTION OF CATV AND WIRELESS SIGNALS

(75) Inventors: Lawrence Edward Watson, Toronto (CA); John Michael Chapeskie, Whitby (CA); Lawrence Tae Young Lee, Caledon (CA); Phillip Man Wai Chan, Toronto (CA); Phing Chu Chang, Toronto (CA)

(73) Assignee: Rogers Communications Inc., Toronto (CA)

( * ) Notice: Subject to any disclaimer, the term of this patent is extended or adjusted under 35 U.S.C. 154(b) by 266 days.

(21) Appl. No.: 13/234,589

(22) Filed: Sep. 16, 2011

(65) Prior Publication Data
US 2013/0070772 A1 Mar. 21, 2013

(51) Int. Cl.
*H04B 7/00* (2006.01)
*H04W 88/14* (2009.01)

(52) U.S. Cl.
CPC .................................. *H04W 88/14* (2013.01)
USPC ........................................................ 370/310

(58) Field of Classification Search
CPC .................................................... H04W 88/14
USPC .......... 370/310, 315, 328; 455/422, 446, 456, 455/500
See application file for complete search history.

(56) References Cited

U.S. PATENT DOCUMENTS

| | | | |
|---|---|---|---|
| 5,303,287 A * | 4/1994 | Laborde ..................... 455/426.1 |
| 5,802,173 A * | 9/1998 | Hamilton-Piercy et al. . 379/56.2 |
| 5,809,395 A | 9/1998 | Hamilton-Piercy et al. |
| 5,953,670 A * | 9/1999 | Newson ........................ 455/454 |
| 6,122,529 A * | 9/2000 | Sabat et al. .................... 455/561 |
| 6,374,124 B1 * | 4/2002 | Slabinski ................... 455/562.1 |
| 6,876,852 B1 | 4/2005 | Li et al. |
| 7,039,399 B2 | 5/2006 | Fischer |
| 7,171,244 B2 | 1/2007 | Bauman |
| 7,403,742 B2 | 7/2008 | Shklarsky et al. |
| 7,606,529 B1 * | 10/2009 | Swan et al. ................... 455/3.06 |
| 7,787,408 B2 | 8/2010 | Proctor, Jr. et al. |
| 7,848,770 B2 | 12/2010 | Scheinert |
| 8,428,033 B2 * | 4/2013 | Hettstedt et al. .............. 370/334 |
| 2004/0166833 A1 * | 8/2004 | Shklarsky et al. ............ 455/413 |
| 2010/0100918 A1 | 4/2010 | Egan, Jr. et al. |
| 2010/0125877 A1 | 5/2010 | Wells et al. |
| 2010/0146564 A1 | 6/2010 | Halik et al. |
| 2010/0171565 A1 | 7/2010 | Okada |

OTHER PUBLICATIONS

Spectrum Management and Telecommunication, Proposals and changes to the Spectrum in Certain Bands Below 1.7 GHz., Industry Canada, Dec. 2005, pp. 1-40.*

* cited by examiner

*Primary Examiner* — Dmitry H Levitan
(74) *Attorney, Agent, or Firm* — Ridout & Maybee LLP

(57) ABSTRACT

A system and method for distributing signals from a first communications network and a second communications network to a location, including a base transceiver station configured to receive a signal from the first communications network and convert the signal into an RF signal for transmission to a mobile terminal, the RF signal having an RF frequency above a threshold frequency, and a coupling module configured to: receive the RF signal from the base transceiver station and receive a data signal from the second communications network, the data signal having an RF frequency below the threshold frequency; combine the RF signal and the data signal into a combined signal with the RF signal and data signal each retaining their respective frequencies; and provide the combined signal over a coaxial cable link to the location.

19 Claims, 3 Drawing Sheets

COAXIAL CABLE DISTRIBUTION OF CATV AND WIRELESS SIGNALS

BACKGROUND

This disclosure relates to distribution of wireless signals to multiple transceivers within a multiple transceiver region using coaxial cable as an intermediate distribution path.

Wireless base transceiver stations (BTSs) communicate wirelessly with devices such as wireless phones, computers, tablets, smart devices, and Machine-to-Machine (M2M) devices using protocols such as LTE (Long Term Evolution), WCDMA (Wideband Code Division Multiple Access), GSM (Global System for Mobile Communications), 802.11, and/or 802.16, among others. A group of BTSs may be connected to a base station controller (BSC), which handles the traffic and signalling between the base station subsystem (BSS, the system comprised of the BTSs and the BSC) and the circuit-switched or packet-switched network responsible for routing the information to the destination device. The coverage area of a BTS comprises a communications site, and a wireless network may have numerous communications sites within a city block, each communications site potentially communicating with multiple access technologies and radio-frequency channels.

One problem with existing wireless networks is that, although mature wireless networks will often be able to provide circuit-switched and packet-switched services to devices outside of buildings, there are still various locations inside buildings where "in-building" grade wireless coverage cannot be conveniently achieved with traditional outdoor communications sites, a problem particularly pronounced in urban centres comprised of numerous buildings. In-building wireless coverage can be particularly compromised in taller buildings and buildings with reflective exteriors.

Another limitation in wireless networks is that the deployment of new external communications site locations to address capacity and coverage limitations (for example, in urban centres) is becoming increasingly difficult and expensive; traditional BTS equipment is costly and requires substantial real estate, and there are difficulties in construction and maintenance access during busy road traffic periods. Additionally, wireless signals from these external communications sites may not be able to penetrate through the walls of a building, or at least may experience some degree of path loss or signal attenuation, and therefore may not be able to provide in-building grade coverage. Alternatively, limiting the number of BTSs in an urban centre to reduce operator costs would result in reduced capacity and data rates given that each BTS would need to accommodate a greater number of mobile terminals (MTs).

Cable TV (CATV) networks are typically implemented with a Hybrid Fibre Coax (HFC) architecture, where fibres carry CATV signals from a CATV head end (the master facility or coax-cable plant used to receive, process and distribute CATV signals over the CATV network to CATV subscribers) to fibre nodes, where coaxial cable lines branch out to the Customer Premises Locations (CPLs) (FIG. 1). The CATV signals may for example include radio signals within the range of 5 MHz-860 MHz, however other frequency ranges can be used in different systems. The CATV infrastructure typically supports bidirectional communication between a customer's location and the head end by using forward and reverse path amplifiers.

SUMMARY OF THE INVENTION

According to an example embodiment is a system for distributing signals from a first communications network and a second communications network to a location. The system includes: a base transceiver station configured to receive a signal from the first communications network and convert the signal into an RF signal for transmission to a mobile terminal, the RF signal having an RF frequency above a threshold frequency; and a coupling module. The coupling module is configured to: receive the RF signal from the base transceiver station and receive a data signal from the second communications network, the data signal having an RF frequency below the threshold frequency; combine the RF signal and the data signal into a combined signal with the RF signal and data signal each retaining their respective frequencies; and provide the combined signal over a coaxial cable link to the location.

According to another example embodiment is a method for distributing signals from a first communications network and a second communications network to a plurality of locations within a region. The method includes: receiving from the first communications network a signal at a base transceiver station at the region and converting the signal into an RF signal suitable for transmission to a mobile terminal and having an RF frequency above a threshold frequency; receiving a data signal having an RF frequency below the threshold frequency from the second communications network; combining the RF signal and the data signal into a combined signal with the RF signal and data signal each retaining their respective original frequencies within the combined signal; and providing the combined signal over a plurality of coaxial cable links to a plurality of locations within the region.

According to a further example embodiment is a system for combining signals from a first communications network and a second communications network. The system includes a coupling module configured to: derive an RF signal from the first communications network and a data signal from the second communications network, the data signal having an RF frequency below that of the RF signal; combine the RF signal and the data signal into a combined signal with the RF signal and data signal each retaining their respective frequency spectrums; and provide the combined signal over a coaxial cable link to a receiving device.

According to another example embodiment is a cable/wireless interface that includes: an interface for receiving a combined signal over a coaxial cable link, the combined signal including an RF signal derived from a first communications network and a data signal derived from a second communications network, the RF signal occupying a higher frequency spectrum than the data signal; a splitter or diplexer for splitting the combined signal into a separate RF signal and data signal that each occupy the same respective frequency spectrum that they occupied as part of the combined signal; and a wireless antenna for transmitting the RF signal to a mobile terminal.

BRIEF DESCRIPTION OF THE DRAWINGS

Example embodiments are presented hereafter with reference to the accompanying drawings in which.

DETAILED DESCRIPTION

Figure 1:
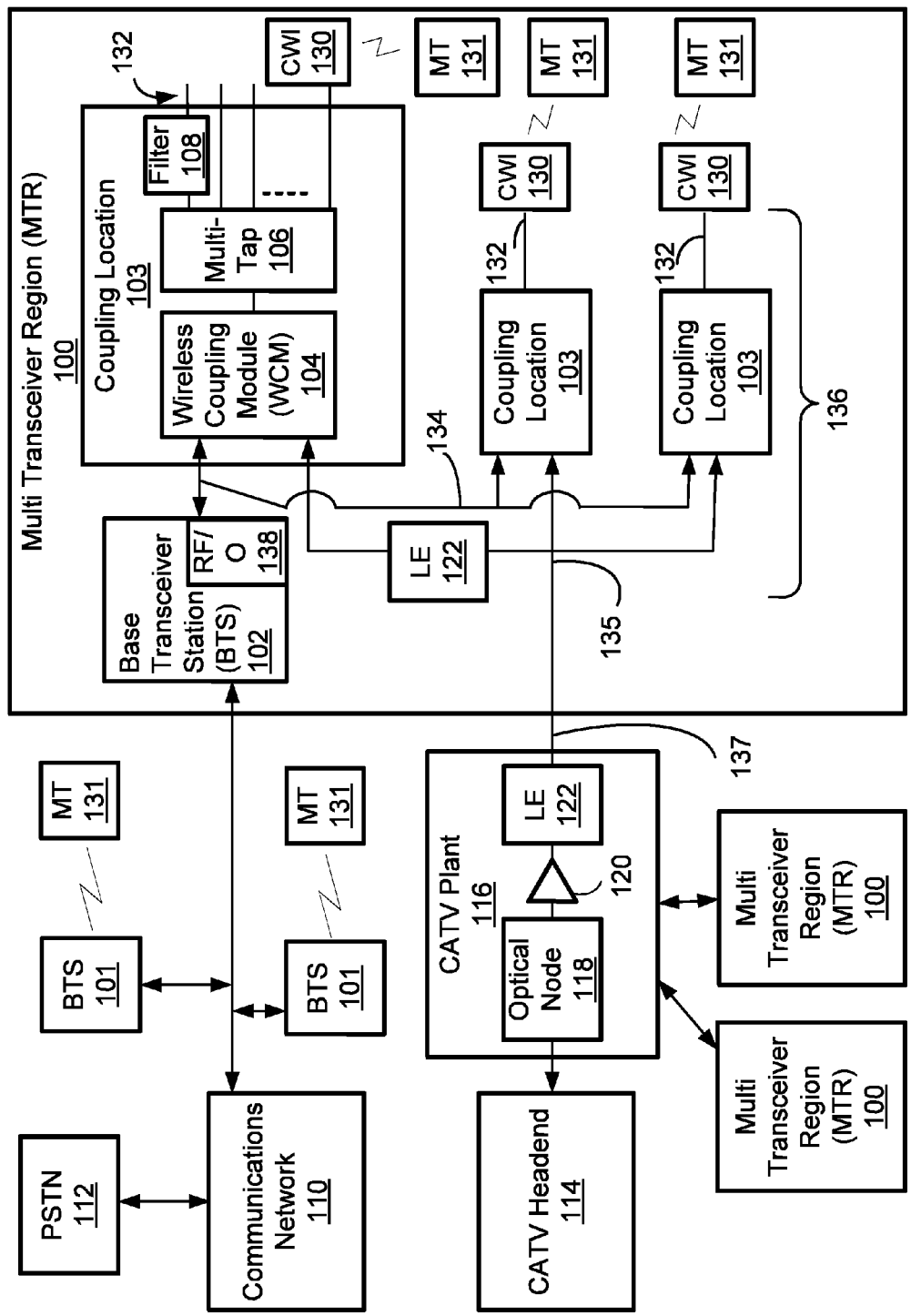
FIG. 1 is a block diagram of a communications system in which coaxial cable provides an intermediate path to distribute wireless signals to multiple transceivers within a region, according to an example embodiment.

Example embodiments are described herein that relate to the distribution of wireless signals within a multiple transceiver region using a coaxial cable network as an intermediate distribution path. In this regard, FIG. 1 illustrates an example embodiment of a communications system in which cable TV and other data signals are provided to a multiple transceiver region (MTR) 100. In the illustrated example, cable TV (CATV) and other data signals are transmitted through a CATV plant 116 from a CATV headend 114 to a plurality of customer locations that include a number of multiple transceiver regions (MTR) 100. The CATV plant 116 may for example include a hybrid fibre/coax network in which fibre is used to deliver optical signals from the headend 114 to an optical node 118, where the signals are converted to radio frequency (RF) signals and passed through one or more trunk amplifiers 120 and line extenders 122 over a coaxial cable link 137 to a multiple transceiver region (MTR) 100. Within the multiple transceiver region (MTR) 100, a local coaxial cable distribution network 136 distributes the CATV and other data signals to multiple locations. The local coaxial cable network 136 can include further line extenders 122 inside the multiple transceiver region (MTR) 100. In an example embodiment, the CATV and data signals provided on coaxial cable link 137 and on the local coaxial cable network 136 are carried on RF frequencies that are less than 1.7 Ghz.

In the example of FIG. 1, a wireless communications network 110 exchanges wireless phone signals with a plurality of base transceiver stations (BTSs) 101, 102, each providing wireless service to one or more mobile terminals (MT) 131 located within a respective BTS coverage area or cell. These signals may for example be addressed for specific mobile terminals (MT) 131 and routed between mobile terminals (MT) 131 and a public switched telephone network (PSTN) 112. The communications network 110 may for example include a base station controller (BSC) which handles the traffic and signalling between a group of BTS's and the circuit-switched or packet-switched network responsible for routing the information to the destination device. The wireless network 110 may have numerous base transceiver stations (BTSs) 101, 102, each base transceiver stations (BTSs) 101, 102 potentially communicating with multiple access technologies and radio-frequency channels. In an example embodiment the communications network 110 uses physical connections such as fibre links to exchange signals with base transceiver stations BTSs 101, 102, which in turn communicate using RF signals with mobile terminals (MT) 131 located within a respective BTS's coverage area or cell. In some example embodiments, the fibre communications links within the communications network 110 may overlap with and share common infrastructure with parts of the network that make up CATV plant 116.

In example embodiments, the mobile terminals (MT) 131 and BTSs 101, 102 are configured to communicate wireless signals wirelessly on RF carrier frequencies that are greater than 1.7 GHz. In some examples, the access technologies employed for wireless communications could, by way of non-limiting example, include one or more of 3G or WCDMA, 4G or Long Term Evolution (LTE), GSM, 802.11, and 802.16 compliant technologies. In some example embodiments the wireless carrier frequencies used for communications between mobile terminals (MT) 131 and BTSs 101, 102 are greater than 1.7 GHz but less than 2.6 GHz range, however in some example applications the carrier frequencies could exceed 2.6 GHz. In some example embodiments the wireless carrier frequencies used for communications between mobile terminals (MT) 131 and BTSs 101, 102 are greater than 2 GHz.

As illustrated in FIG. 1, mobile terminals (MT) 131 can roam into and out of multiple transceiver regions (MTR) 100. A multiple transceiver regions (MTR) 100 may for example be a multiple unit building or structure such as a multiple unit residential dwelling (such as but not limited to a multi-story condominium, apartment or dormitory building) or a multiple unit commercial structure (such as but not limited to a hotel or office building, or a combined use structure). In some example embodiments, a multiple transceiver region (MTR) 100 could include a geographic region having multiple structures, for example multiple single family dwellings and/or multiple unit structures that are grouped together. In order to provide quality coverage to areas located within multiple transceiver regions (MTR) 100, example embodiments are described herein for coupling wireless RF signals from communications network 110 onto part of a local CATV network 136 by positioning one or more base transceiver stations (BTS) 102 and one or more wireless coupling modules (WCM) 104 at the location of a multiple transceiver region (MTR) 100. The local CATV network 136 may for example be an in-building network where the multiple transceiver region (MTR) 100 is contained within a multi-unit dwelling or structure, or a neighbourhood network where the multiple transceiver region (MTR) 100 is a group of single or multiple unit dwellings or buildings.

In this regard, as shown in FIG. 1, the local CATV network 136 illustrated in multiple transceiver region (MTR) 100 is similar to a conventional local or in-building CATV network that serves either a group of single family dwellings or multiple units in a building (or a combination of both) in that it includes communications links 135 (which may for example be a coaxial cable network but which could include other types of transmission mediums) that provide CATV signals from the CATV plant 116 to a plurality of distribution panels or locations 103 that are located through-out the multiple transceiver region (MTR) 100. Each of these distribution locations 103 in turn includes a wide-band multi-tap 106 that connects to a plurality of coaxial cable links 132, with each link 132 providing CATV data signals to a respective cable input/outlet interface located at a subscriber location within the multiple transceiver region (MTR) 100. In an example embodiment, each coaxial cable link 132 is an RG-6 coaxial cable; however other types of coaxial cable or wired links could be used. By way of non-limiting example, the subscriber location could be a condo, apartment, or dorm room in a multiple dwelling unit, an office or room or other location in a commercial building, or a single family dwelling, within the multiple transceiver region (MTR) 100. The local CATV network 136 is a two-way network in that downstream and upstream traffic can be exchanged between CATV plant 116 and devices located at subscriber locations in the multiple transceiver region (MTR) 100.

As shown in FIG. 1, in an example embodiment, the base transceiver station (BTS) 102 that services the multiple transceiver region (MTR) 100 is similar to external base transceiver stations (BTS) 101 that are connected to wireless communications network 110, except that instead of using a wireless antenna to directly communicate with mobile terminals (MT) 131, the base transceiver station (BTS) 102 uses parts of the in-building CATV network 136 as an intermediate link to communicate with in-building mobile terminals (MT)

131. In particular, in the illustrated embodiment, the base transceiver station (BTS) 102 is connected by a local fibre network in the form of optical fibre links 134 to the distribution locations 103 that are located throughout the multiple transceiver region (MTR) 100, enabling wireless signals to be exchanged over coaxial cable links 132 with cable/wireless interfaces (CWI) 130 (multiple transceivers) that are located in respective units within the multiple transceiver region (MTR) 100. In some example embodiments, coaxial cable or other types of transmission medium could be used in the place of fibre cable to provide communication links 134.

In some example embodiments where the multiple transceiver region (MTR) 100 is multiple unit structure, the base transceiver station (BTS) 102 is located within the structure in a server room that includes power and climate control for the base transceiver station (BTS) 102—however the base transceiver station (BTS) 102 could also be positioned external to but near the multiple unit structure. In embodiments where the multiple transceiver region (MTR) 100 served by a base transceiver station (BTS) 102 includes a plurality of structures such as single unit or family dwellings, the base transceiver station (BTS) 102 can be located outside or in a protective structure in the neighbourhood of the dwellings.

Figure 2:
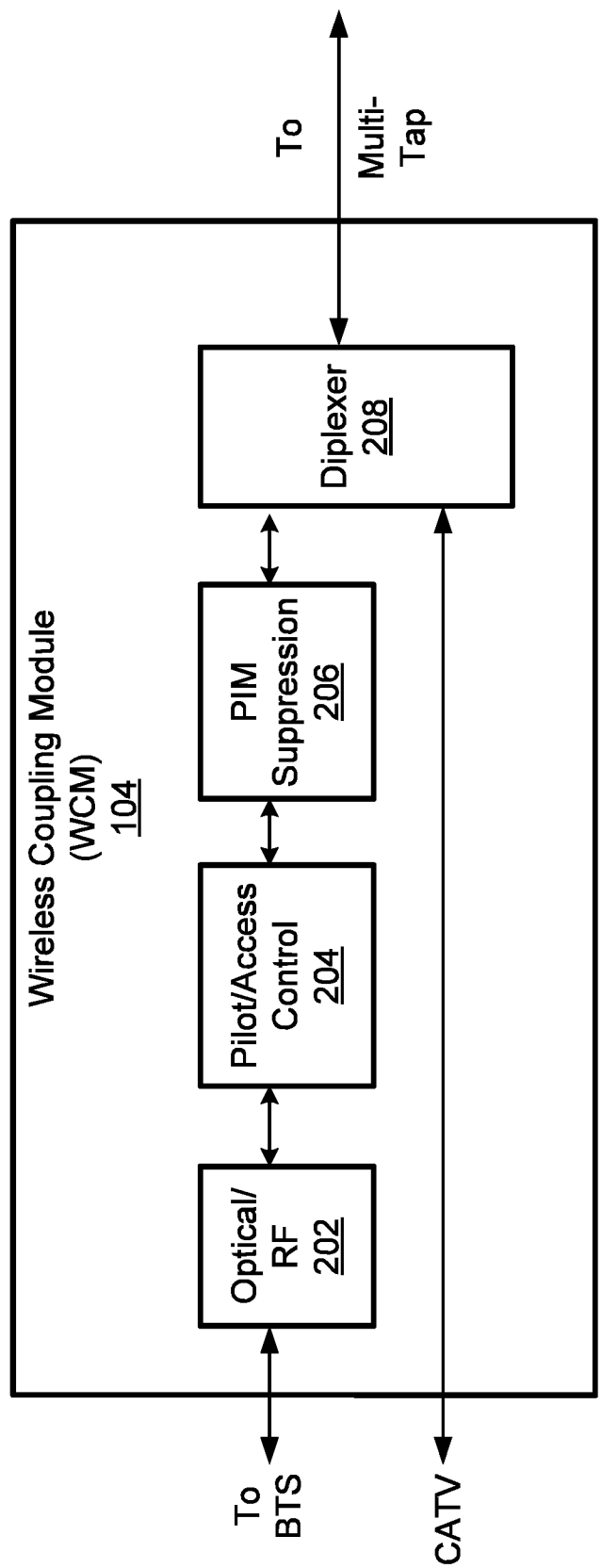
FIG. 2 is a block diagram of a wireless coupling module of the communications system of FIG. 1, according to an example embodiment.

In some example embodiments, the base transceiver station (BTS) 102 is similar to typical base transceiver stations (BTS) 101 throughout the communications network 110 in that it produces wireless signals that are ready for over the air RF transmission to mobile terminal (MT) 131. Accordingly, in example embodiments where communication links 134 are fibre optic links, an RF/optical media converter 138 is located at or integrated into the base transceiver station (BTS) 102 to convert the downlink or forward path RF signals generated by the base transceiver station (BTS) 102 to optical signals for transmission over local fibre network 134 to distribution locations 103. Similarly, uplink or reverse path optical signals on the fibre network 134 are converted by RF/optical media converter 138 into RF signals for processing by the base transceiver station (BTS) 102. In an example embodiment, the RF/optical media converter 138 is connected to an antenna port of the base transceiver station (BTS) 102. In example embodiments where a conductive link such as a coaxial cable link is used as the transmission medium between base transceiver station (BTS) 102 and distribution locations 103 RF/optical media converter 138 is not required and the RF output of base transceiver station (BTS) 102 can be applied directly to the communications links 134. In the illustrated embodiment, each distribution location 103 includes a wireless coupling module (WCM) 104 for combining CATV and data signals received over CATV in-building network 135 with wireless signals from base transceiver station (BTS) 102 over local fibre network or links 134. In this regard, as shown in FIG. 2, the wireless coupling module (WCM) 104 includes a diplexer 208 for combining wireless signals received from base transceiver station (BTS) 102 with CATV and data signals received from CATV plant 116. In order to process the wireless signals before they are diplexed with the CATV signals, the wireless coupling module (WCM) 104 includes an optical/RF media converter 202 (in the case where fibre optic communications link is used with the base station transceiver 102), a pilot/access control module 204 and a passive intermodulation (PIM) suppression module 206 in its wireless forward path. The optical RF media converter 202 converts the optical signals received over fibre link 134 back into RF wireless signals, and can be omitted where the wireless signals are received over an electrically conductive path such as a coaxial cable. As indicated above, in example embodiments, mobile terminals (MT) 131 and base transceiver stations (BTS) 101, 102 are configured to communicate using RF carrier frequencies that are greater than 1.7 GHz, and accordingly the RF wireless signal output by optical/RF converter 202 has a frequency greater than 1.7 Ghz or higher.

In at least some example embodiments, a reference pilot channel is inserted into the RF wireless signal by pilot/access control module 204 for two purposes: (a) to provide a reference signal that a receiving cable/wireless interface (CWI) 130 can use to set forward path and reverse path amplifier gain; and (b) to provide access control information for activating a receiving cable/wireless interface (CWI) 130—in this regard, the reference pilot channel could for example include encrypted bits that a receiving cable/wireless interface (CWI) 130 would have to decode in order to activate. In some example embodiments the pilot/access control module 204 may be omitted or may be used to perform different purposes or only one of the two purposes noted above.

In some example embodiments PIM suppression module 206 is configured to suppress noise caused by passive intermodulation and thus optimize the wireless signal input power at the input of diplexer 208. PIM suppression module 206 could have a custom set up for its respective distribution location 103 to account for the unique nature of the coax network connected to each distribution location 103. In some embodiments, PIM suppression module 206 could be omitted or replaced with or supplemented by other noise reduction methods.

Diplexer 208 is used to combine the RF wireless signals and CATV signals. As noted above, in example embodiments, the RF wireless signals have a frequency greater than 1.7 Ghz and the CATV signals have a frequency less than 1.7 Ghz, and accordingly in example embodiments the diplexer 208 simply combines the RF wireless signals and CATV signals together without any frequency shifting of the respective signals such that the original frequency spectrums of the RF wireless signals and CATV signals are maintained in the combined signal. In example embodiments, the diplexer 208 provides impedance matching and a flat frequency response for both the RF wireless signals and the CATV signals. The combined wireless/CATV signal output by diplexer 208 is provided to a wideband multi-tap 106.

Turning again to FIG. 1, as noted above, the combined wireless/CATV signal from the diplexer 208 is provided to a wideband multi-tap 106 which outputs the combined signal onto a plurality of coaxial cable links 132, with each link 132 providing a wired link to a respective location or unit in the multiple transceiver region (MTR) 100. By way of non-limiting example a multi-tap 106 could supply the combined wireless/CATV signal to one (1) to sixteen (16) coaxial cable links 132. In example embodiments, the diplexer 208 is located after the final line extender 122 in the in-building CATV network 136.

In some example embodiments, a further form of access control can be provided at the distribution location 103 by providing low pass filters 108 at the tap outputs that service cable links 132 in order to control which units have access to the wireless signals. In particular, the low pass filter 108 filters out the higher frequency wireless signals so that they are not provided on the coaxial cable link 132 to which the low pass filter 108 is connected. The filter 108 can be removed once an authorized cable wireless interface 130 is associated with the respective coaxial cable link 132. In some example embodiments the filter 108 is manually removed by a technician, although in some embodiments it may be remotely controlled. In example embodiments the wireless coupling module 104 is a stand-alone box that uses relatively little power and generates relatively little heat and includes a limited set of electronic components as required to perform the functions noted above. In such embodiments the wireless coupling module (WCM) 104 does not have a network presence, although it can in some embodiments have a limited ability to report an error status back to the base transceiver station (BTS) 102 or other monitoring device. In some example embodiments, the wireless coupling module (WCM) 104 could be an enhanced module having a network presence, be remotely controllable and perform numerous functions beyond those described above.

Figure 3:
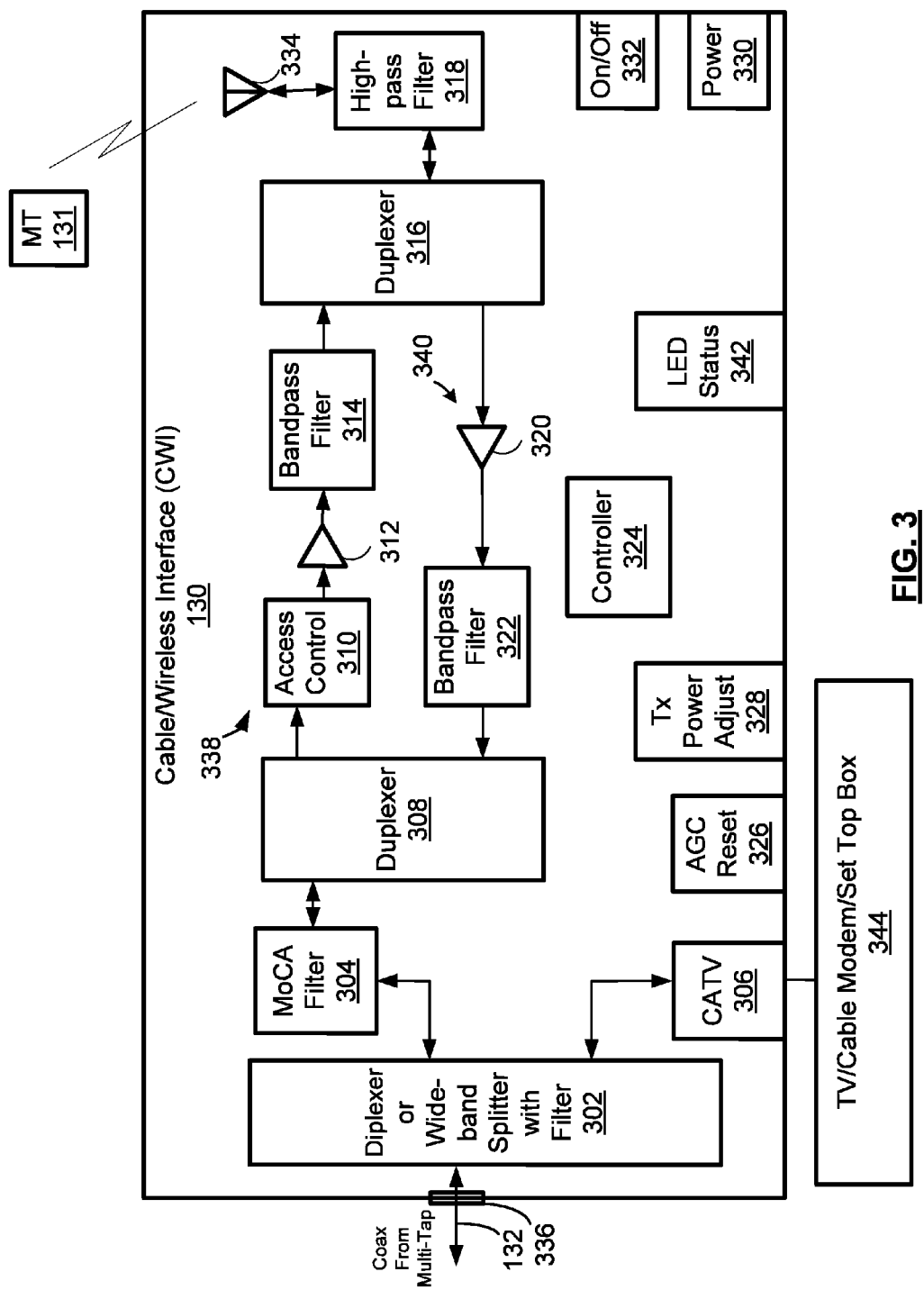
FIG. 3 is a block diagram of a cable/wireless interface unit of the communications system of FIG. 1, according to an example embodiment.

Reference is now made to FIG. 3 which shows in greater detail an example embodiment of a cable/wireless interface (CWI) 130 that is located at a subscriber location within the multiple transceiver region (MTR) 100 for providing wireless service to a mobile terminal 131 located at the subscriber location. As noted above, the subscriber location could for example be a residential condominium or apartment or dormitory unit, an office, or other commercial or residential unit, or a single family dwelling, among other locations. In example applications, the subscriber location will be a location that includes a CATV coaxial cable interface and which may have poor cellular coverage provided by traditional base-transceiver stations 101. In at least some example embodiments the subscriber location is a physical space that is owned by, leased by, or otherwise associated with a person or entity (e.g. a customer) who can be billed for the use of the cable/wireless interface (CWI) 130. In the illustrated embodiment, the cable/wireless interface (CWI) 130 is a standalone device having its own housing and a coaxial interface 336 to allow it to be releasably connected to the end of the coaxial cable link 132 (which for example can be an RG-6 link) that is provided to the customer's unit, however in other example embodiments all or some of the components of the cable/wireless interface (CWI) 130 could be integrated into other electronic devices located at the customer's unit, including for example a cabinet-top-style CATV access box. In the illustrated example, the cable/wireless interface (CWI) 130 includes a controller 324, an on/off switch 332, and a power interface 330. The controller 324 which may for example include a microprocessor circuit, controls the operation of at least some of the electronic components that make up the cable/wireless interface (CWI) 130; the power interface 330 allows the cable/wireless interface (CWI) 130 to be connected to a power source and may include an AC/DC converter and also a backup battery.

As shown in FIG. 3, the cable/wireless interface (CWI) 130 includes a wideband splitter 302 connected to receive the combined wireless/CATV signal through coaxial interface 336 from the distribution location 103. The wideband splitter 302 separates the CATV signals from the wireless signal by frequency—in an example embodiment the signals are separated based on which signals are above a threshold frequency (the wireless path signals being higher than 1.7 GHz) and which are below the threshold frequency (CATV path signals being lower than 1.7 Ghz). In an example embodiment, wideband splitter 302 includes a high pass filter and basic filtering is used to split the CATV and wireless path signals without any frequency shifting occurring. In some examples, a diplexer is used in place of a wideband splitter to implement component 302. In the illustrated embodiment, CATV signals are provided to a CATV coaxial interface or port 306 on the cable/wireless interface (CWI) 130. A communications device 344 can be connected to the CATV port 306 for exchanging signals with the CATV plant 116. For example, the communications device 344 could be a cabinet-top-style CATV access box, a cable modem (and associated Wi-Fi network), a television, or other communications device. In some example embodiments a CATV port 306 is omitted and the wide-band splitter 302 can be replaced with a high pass filter for separating the RF wireless path signals from the CATV signals.

In an example embodiment, after being separated at wideband splitter 302, the wireless signals are provided to a MoCA (Multimedia over Coax Alliance) filter 304 to block MoCA signals while permitting passage of the RF wireless signals. As indicated in FIG. 3, in an example embodiment the wireless signal path on the cable/wireless interface (CWI) 130 includes a forward path 338 and a reverse path 340, with duplexers 308 and 316 being located at the opposite ends of the forward and reverse paths 338, 340 to separate the forward and reverse signals. The forward wireless path 338 can include an access control module 310 that checks for the presence of the reference pilot channel that was inserted by the pilot/access control module 204 of the wireless coupling module (WCM) 104, as well as for the encrypted activation bits inserted on the reference pilot channel. In example embodiments, if the reference pilot channel or the encrypted activation bits are not detected then the access control module 310 prevents operation of the cable/wireless interface (CWI) 130. In at least some embodiments, information for validating and decrypting the activation bits are pre-stored on the cable-wireless interface (CWI) 130 so that it can self-activate once plugged into a signal source and a power source. In some example embodiments, access control module 310 can be omitted or replaced with different access control methods.

In the illustrated example, an amplifier circuit 312 is included in the forward path 338 for amplifying the forward wireless RF signals. In one example embodiment, the amplifier circuit 312 is configured to set an amplifier gain based on a comparison of the strength of the reference pilot channel to a predetermined threshold, thereby mitigating for losses over the RG-6 coax cable link 132. In some examples, the gain may be set once on installation, however in some examples the pilot channel may be monitored continuously or periodically and the result used to adjust the gain as required. In some example embodiments, the reverse path 340 also includes an amplifier circuit 320 and substantially the same gain that is applied to the forward path amplifier circuit 312 is also applied to the reverse path amplifier circuit 320 to provide balanced gain in both the forward and reverse paths.

In some examples, rather than using a reference pilot channel to set amplifier gain, the amplifier circuits 312 and 320 may alternatively be configured to implement automatic gain control (AGC) to amplify the wireless signals in both the forward and reverse paths in response to variations in cable loss. By way of example, without reference to a reference pilot signal, the strength of one or more aspects of the wireless signal received at the forward amplifier circuit 312 can be amplified to match one or more predetermined strength thresholds as required, and substantially the same gain then applied to the reverse path amplifier circuit 320 as is applied to the forward path amplifier circuit 312 to provide balanced AGC gain in both the forward and reverse paths.

In some example embodiments, amplifier circuits 312 and 320 implement a non-revertive AGC algorithm to set a maximum amplifier gain to mitigate against power saturation of the amplifiers and to mitigate against wide fluctuations in amplifier gain and the wireless coverage provided by the cable wireless interface (CWI) 130. As the non-revertive AGC algorithm may occasionally set the maximum amplifier gain at too low a level if temporary signal strength spikes are experienced, in some example embodiments the cable/wireless interface (CWI) 130 includes a physical AGC reset switch or button 326 that can be activated by a user to reset the non-revertive AGC algorithm.

In some example embodiments, including embodiments that may or may not make use of a reference pilot channel, at least one of the access control module 310 or the amplifier circuit 312 implements a forward path signal sensing algorithm to determine if an appropriate strength of wireless signal is being received by the cable/wireless interface (CWI) 130. In the event that little or no wireless signal (determined by comparison to a minimum threshold) is being sent to the cable/wireless interface (CWI) 130 from the coax link 132, then the wireless path of the cable/wireless interface is deactivated. In some applications, in addition to preventing device malfunction, such a feature can also be used as a mechanism to prevent unauthorized use of cable/wireless interface (CWI) 130. An LED status indicator 342 can be provided on the housing of the cable/wireless interface (CWI) 130 to provide a visual indication of whether a wireless signal of sufficient strength is present and an operational status of the cable/wireless interface (CWI) 130.

In an example embodiment, the reverse path amplifier circuit 320 is configured to implement a reverse path signal sensing algorithm in order to deactivate the cable/wireless interface (CWI) 130 in the event that the reverse path amplifier circuit 320 is being overdriven. Such a feature can mitigate against amplification of foreign wireless signals in the system.

In the illustrated embodiment, a forward path bandpass filter 314 is located at the output of the forward amplifier circuit 312 and a reverse path bandpass filter 322 is located at the output of the reverse amplifier circuit 320. These bandpass filters 314, 322 are provided to reduce PIM products created at the outputs of the amplifiers and to mitigate against gain oscillation.

The cable/wireless interface (CWI) 130 includes an antenna 334 connected to duplexer 316 for transmitting RF wireless signals over the air to a mobile terminal 131 and receiving RF wireless signals over the air from the mobile terminal 131. As noted above, in example embodiments the RF wireless signals transmitted over the air have a frequency of greater than 1.7 Ghz. As shown in FIG. 3, a high pass filter 318 is located between the antenna 334 and the duplexer 316 in order to mitigate against external low band wireless signals entering the CATV network.

In the illustrated embodiment, the cable/wireless interface 130 includes a physical transmitter power adjust switch or button 328 on its housing that permits a user to select one of a plurality of base amplification ranges for amplifiers 312 and 320, such as for example a low, medium and high range which amplifies the wireless signal for short, standard or extended range capabilities, respectively. Such a feature allows the transmitted wireless signal strength to be adjusted for the requirements of the environment that the cable/wireless interface 130 is located in.

In example embodiments, the same wireless communications protocol (by way of non-limiting example 3G, 4G or LTE) is used for communications between mobile terminal (MT) 131 and in-building cable/wireless interface (CWI) 130 as is used between the same mobile terminal (MT) 131 for direct over the air communications with external base transceiver stations (BTSs) 101. A change in communications protocol is not required as the mobile terminal (MT) 131 roams from the coverage "cell" or area provided by a particular in-building base transceiver station (BTS) 102 and its associated cable/wireless interface (CWI) 130 to the coverage "cell" or area provided by an external base transceiver station (BTS) 101 in the communications network 110. From the perspective of both the mobile terminal (MT) 131 and the wireless communication network 110, the transition of the mobile terminal between base transceiver stations 102 and 101 that are connected to the communications network 110 is treated as a normal handoff with no change in protocol or network provider—the base station transceiver BTS 102 serving a multiple transceiver region 100 is perceived by the communications network 110 as a usual base transceiver station, just as external BTS 101. Such a configuration is different than mobile devices that can switch protocols to use Unlicensed Media Access (UMA) or similar wireless protocols to communicate with Wi-Fi hotspots, as such mobile devices must be configured to switch wireless communications protocols when transitioning between communications networks. In the presently described embodiments, mobile terminals (MT) 131 need only be configured to communicate with the communications network 110 using a single communications protocol.

Furthermore, in the example embodiments described herein, the CATV signals and wireless signals operate in different frequency ranges and accordingly frequency shifting is not required to pass the wireless signals through parts of a local or in-building CATV network. Such frequency differentiation allows the equipment required to modify a local CATV network for hybrid distribution of CATV and wireless signals to be relatively basic and inexpensive.

Accordingly, in example embodiments the base transceiver station (BTS) 102 located at a multiple transceiver region (MTR) 100 behaves substantially as the equivalent of a typical wireless base transceiver station (BTS) 101 of the communications network 110 in that it receives an internet protocol (IP)-based signal over fibre from the communications network 110 (which may for example be a Public Land Mobile Network (PLMN)) and produces a wireless RF signal over 1.7 GHz. However, instead of attempting to transmit the RF signal wirelessly through walls and other obstacles of region 100 to mobile terminals (MT) 131 within its coverage area, the base transceiver station (BTS) 102 converts the RF signal to an optical signal that is distributed to wireless coupling modules (WCM) 104 located throughout the site 100, where the optical signals are converted back to the original wireless RF signal that exceeds 1.7 GHz. At the wireless coupling modules (WCM) 104, the wireless RF signal is combined at a diplexer 208, without the need for any frequency-shifting, with the CATV signal coming into the multiple transceiver region (MTR) 100 from the CATV head end 114. The combined wireless RF signal and CATV signal is distributed over RG-6 coaxial cable links 132 to subscriber locations within the multiple transceiver region (MTR) 100 where a cable/wireless interface (CWI) 130 separates the wireless and CATV signals and wirelessly transmits the wireless signal to a receiving mobile terminal (MT) 131. In example embodiments, the RG-6 coaxial cable links 132 are used for the simultaneous, bidirectional distribution of both CATV signals and the wireless RF signals, all at their original, un-shifted frequencies. The coverage area or "cell" of the on-site base transceiver station (BTS) 102 is extended to include the micro coverage areas of multiple transceivers—namely each of the cable-wireless interfaces (CWI) 130—that are connected to the base transceiver station (BTS) 102.

The system described herein allows frequency separated signals from a first network (communications network 100) and a second network (CATV network 114,116) to simultaneously share parts of an in-building coaxial cable plant.

In some example embodiments, the communications links between the base transceiver station (BTS) 102 and the wireless coupling modules (WCM) 104 may be a coaxial cable link such that RF/optical conversion is not required between the base transceiver station (BTS) 102 and the wireless coupling modules (WCM) 104.

Although the cable/wireless interface (CWI) 130 shown in FIG. 3 is single band, multiple forward and reverse paths 338, 340 can be used to implement a multi-band capable system (so long as the bands each operate out of the CATV frequency ranges).

In some example embodiments, multiple base transceiver stations 102 may be coupled to single distribution location 104.

While example embodiments have been described in detail in the foregoing description and figures, it will be understood by those skilled in the art that variations may be made without departing from the scope of the invention, being limited only by the appended claims.

What is claimed is:

1. A system for distributing signals from a first communications network and a second communications network to a location, comprising:
   a base transceiver station configured to receive a signal from the first communications network and convert the signal into an RF signal for transmission to a mobile terminal, the RF signal having an RF frequency above a threshold frequency; and
   a coupling module configured to:
      receive the RF signal from the base transceiver station and receive a data signal from the second communications network, the data signal having a RF frequency below the threshold frequency;
      combine the RF signal and the data signal into a combined signal with the RF signal and data signal each retaining their respective frequencies; and
      provide the combined signal over a coaxial cable link to a cable/wireless interface at the location,
      wherein a forward path signal sensing module of the cable/wireless interface deactivates an RF element of the cable/wireless interface when the forward path signal sensing module determines a strength of the RF signal separated out from the combined signal to be below a threshold signal strength.

2. The system of claim 1 wherein the base transceiver station is coupled to the coupling module by a fibre optic link, the system including an RF/optical media converter at the base transceiver station configured to convert the RF signal to an optical signal for transmission over the fibre optic link, the coupling module including an RF/optical media converter for converting the optical signal received over the fibre optic link back to the RF signal.

3. The system of claim 1 wherein the base transceiver station is coupled to the coupling module by an electrically conductive link.

4. The system of claim 1 wherein the first communications network is a wireless communications network including a plurality of further base transceiver stations each configured to communicate directly over the air with respective mobile terminals located within coverage areas thereof using a common wireless protocol, wherein the RF signal also conforms to the common wireless protocol enabling a mobile terminal to roam between the base transceiver station and any of the further base transceiver stations while using the common wireless protocol.

5. The system of claim 4 wherein the second communications network includes a CATV network and the data signal includes a CATV signal.

6. The system of claim 4 wherein the location is a unit within a multiple unit building having a plurality of subscriber locations, the base transceiver station being located at the multiple unit building.

7. The system of claim 6 including a multi-tap for receiving the combined signal from the coupling module and outputting the combined signal onto multiple coaxial cable links to a plurality of the subscriber locations within the multiple unit building.

8. The system of claim 7 including a low pass filter on at least one of the coaxial cable links to filter out the RF signal from the combined signal and pass the data signal.

9. The system of claim 1 wherein the threshold frequency is 1.7 Ghz.

10. The system of claim 1 wherein the cable wireless interface includes a wideband splitter or diplexer for separating based on the threshold frequency the combined signal into the RF signal and the data signal, and a wireless antenna for transmitting the RF signal to the mobile terminal.

11. The system of claim 1 wherein the coupling module is configured to insert a reference signal into the RF signal, and includes a diplexer for combining the RF signal having the inserted reference signal with the data signal to output the combined signal.

12. A method for distributing signals from a first communications network and a second communications network to a plurality of locations within a region, comprising:
   receiving from the first communications network a signal at a base transceiver station at the region and converting the signal into an RF signal suitable for transmission to a mobile terminal and having an RF frequency above a threshold frequency;
   receiving a data signal having an RF frequency below the threshold frequency from the second communications network;
   combining the RF signal and the data signal into a combined signal with the RF signal and data signal each retaining their respective original frequencies within the combined signal; and
   providing the combined signal over a plurality of coaxial cable links to a plurality of locations within the region, the combined signal received by a cable/wireless interface at each of said plurality of locations,
   wherein a forward path signal sensing module of the cable/wireless interface deactivates an RF element of the cable/wireless interface when the forward path signal sensing module determines a strength of the RF signal separated out from the combined signal to be below a threshold signal strength.

13. The method of claim 12 comprising, prior to combining the RF signal and the data signal, converting the RF signal to an optical signal at the base transceiver station, transmitting the optical signal from the base transceiver station over a fibre link, and converting the optical signal back to the RF signal.

14. The method of claim 12 wherein the first communications network is a wireless communications network including a plurality of further base transceiver stations each configured to communicate directly over the air with respective mobile terminals located within coverage areas thereof using a common wireless protocol, wherein the RF signal also conforms to the common wireless protocol enabling a mobile terminal to roam between the base transceiver station and any of the further base transceiver stations while using the common wireless protocol.

15. The method of claim 14 wherein the second communications network includes a CATV network and the data signal includes a CATV signal.

16. The method of claim 12 wherein the region is a multiple unit building and the base transceiver station is located within the building.

17. The method of claim 12 comprising inserting a reference signal into the RF signal prior to combining the RF signal with the data signal.

18. A system for combining signals from a first communications network and a second communications network, comprising:
    a coupling module configured to:
        derive an RF signal from the first communications network and a data signal from the second communications network, the data signal having an RF frequency below that of the RF signal;
        combine the RF signal and the data signal into a combined signal with the RF signal and data signal each retaining their respective frequency spectrums; and
        provide the combined signal over a coaxial cable link to a receiving device,
        wherein a forward path signal sensing module of the receiving device deactivates an RF element of the receiving device when the forward path signal sensing module determines a strength of the RF signal separated out from the combined signal to be below a threshold signal strength.

19. The system of claim 18 wherein coupling module includes an RF/optical media converter for converting an optical signal received over a fibre optic link from the first communications network into the RF signal.

* * * * *